No. 733,316. Patented July 7, 1903.

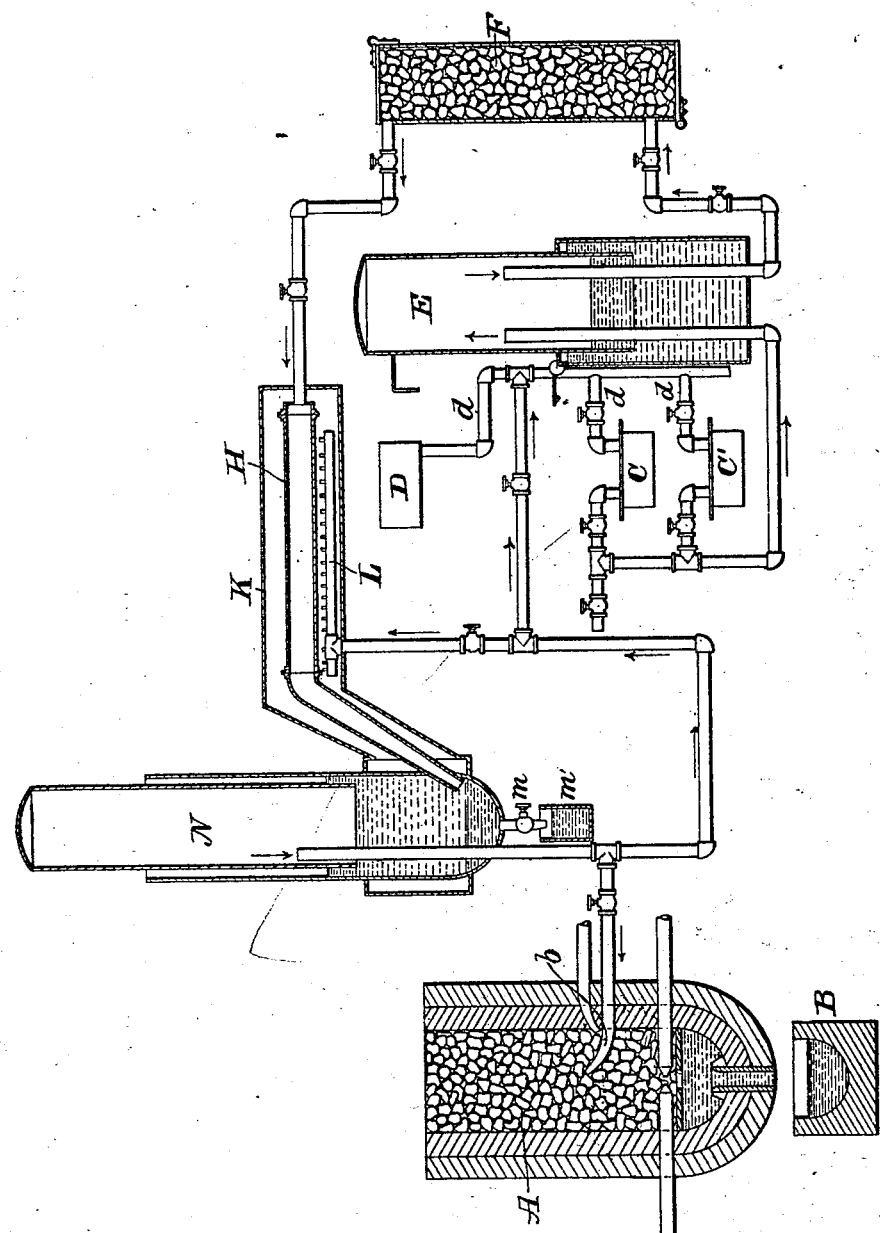

UNITED STATES PATENT OFFICE.

ROBERT KENNEDY DUNCAN, OF WASHINGTON, PENNSYLVANIA, ASSIGNOR TO GENERAL CHEMICAL COMPANY, OF NEW YORK, N. Y.

PROCESS OF MAKING PHOSPHORUS.

SPECIFICATION forming part of Letters Patent No. 733,316, dated July 7, 1903.

Application filed December 9, 1902. Serial No. 134,517. (No specimens.)

*To all whom it may concern:*

Be it known that I, ROBERT KENNEDY DUNCAN, a resident of Washington, in the county of Washington and State of Pennsylvania, have invented certain new and useful Improvements in Processes for the Production of Phosphorus; and I do hereby declare the following to be a full, clear, and exact description of the invention, such as will enable others skilled in the art to which it appertains to make and use the same.

This invention consists in an improved process for the production of phosphorus.

The manufacture of phosphorus on a commercial scale was carried on for many years by the following process: Bone-ash was heated with sulfuric acid, which converted it into soluble calcium phosphate, which was then evaporated down and heated, under which circumstances it became calcium metaphosphate. This metaphosphate was then mixed with carbon and preferably sand and the phosphorus distilled out of the mixture. The phosphorus so produced was yellow phosphorus only and required purifying because of presence in it of carbonaceous and other impurities mechanically carried over in the process of distillation. The methods of purifying were tedious, dangerous, and expensive, owing to the inflammable and poisonous nature of the yellow phosphorus.

The above method has within recent years been largely displaced by what is known as the "electric-furnace" method of production, which consists in the following steps: Phosphatic material is mixed with the necessary amount of carbonaceous material, and the mixture is placed in an electric furnace, under the intense temperature of which the phosphorus is distilled out in the yellow form and is collected under water in the usual way. The disadvantages of this process are—

First. Only about sixty (60) per cent. of the phosphorus contained in the charge can be distilled out.

Second. It requires the very highest heat obtainable of an electric furnace to effect such direct distillation, resulting in the consumption of a large amount of energy with its attendant expense.

Third. Yellow phosphorus alone can be produced by this method. In the event it is desired to produce red phosphorus, which is a very valuable product, it is necessary in either of the foregoing processes to heat the yellow phosphorus so produced in closed tubes, under which circumstances it becomes slowly converted into red phosphorus.

Fourth. The yellow phosphorus produced by the method last described must be purified, as in the earlier process.

The object of my improved process is to produce pure red or yellow phosphorus more economically than has been possible by any process that has been heretofore employed; and with this end in view my invention consists, first, in the method of producing phosphorus consisting in subjecting phosphatic material to the decomposing action of an electric current and exposing the product derived therefrom to the action of water and finally disassociating the crude gases evolved and producing either red or yellow phosphorus.

The invention further consists in certain other steps in the process, which will be hereinafter described, and pointed out in the claims.

The accompanying drawing is a diagrammatic illustration of an apparatus which may be employed for carrying my improved process into effect.

Phosphatic material of any nature is used that will when heated with carbon result in a product from which phosphorus hydrids may be obtained—as, for instance, bone-black, bone-ash, or mineral phosphate. I have obtained good results from the use of bone-black and bone-ash. The phosphatic material is powdered and mixed with powdered carbon in approximately the proportions of seventy-seven (77) parts of phosphatic material to twenty-three (23) parts of carbon, although these proportions may be varied. A small amount of tar is then preferably added to the mixture and serves as a binder to make it cohere. The mixture is then dried and charged into an electric furnace A, which may be of any suitable type or construction, and heated by either a continuous, alternating, or intermittent current, which passes through the electrodes and the mixture as it is gradually fed between the adjacent ends of the electrodes, or the mixture may be otherwise subjected to the heating or decomposing action of an electric current. A preminary heating of the mixture is effected by a hydrogen-burner b, the hydrogen supplied thereto being a by-product of the process. The electric current supplied to the furnace is regulated so as not to produce a temperature sufficiently high to break down the phosphid as it is produced into phosphorus and carbid. By employing the hydrogen-burner to preliminarily heat the mixture great economy in the use of electric energy is effected, owing to the fact that a smaller volume of current will suffice to reduce the heated mixture to calcium phosphids than would be the case if the charge were not heated by the hydrogen-burner, and a much smaller volume of current will suffice to produce the phosphids, which contain practically all the phosphorus in the original charge, than was required to produce phosphorus direct from the charge, which process, as has been stated, yields only about sixty per cent. of the phosphorus contained in the charge. The calcium phosphid is continuously produced and removed from the furnace from time to time and discharged into any suitable receptacle B. In exposing phosphatic material to the action of an electric furnace various calcium phosphids are produced, which may vary according to the temperatures employed. The phosphids thus produced are then charged into either one of the decomposition-chambers C C' for the production of phosphorus hydrids in the following manner:

D is a water-tank, from which water is supplied to the chambers C C' by the pipes d, which are provided with suitable valves for shutting off or controlling the supply of water to the chambers, two being employed in order that while one is in use the other may be cleaned and charged and put in readiness for use. After one of the chambers has been charged with calcium phosphid and before water has been admitted thereto hydrogen gas is permitted to flow from the gasometer to such charged chamber and drive out and replace the air contained therein in order to avoid the risk of explosion which would attend the mixing of phosphorus hydrids with atmospheric air. After the charge of calcium phosphids has been thus covered and protected by hydrogen water is supplied to the chamber, with the result that a complex mixture of phosphorus hydrids is evolved, which is conducted from the chamber into a gasometer E, which serves as a pressure-regulator and which under some conditions might be dispensed with. The phosphorus hydrids thus produced are passed through a drying-chamber F, which is filled with calcium phosphid, which absorbs the water or moisture contained in the phosphorus hydrids and so enriches the latter, which are then conducted into a heater consisting of a jacket K, provided with a metal lining H and a burner L, located below the tube. The burner is furnished with any desired number of jets, a supply of hydrogen from a gasometer being furnished thereto. By regulating the heat supplied to the heater either red or yellow phosphorus may be produced, a lesser amount of heat being required to produce red phosphorus. When red phosphorus is produced, it is formed in the tube and may be removed therefrom from time to time. If yellow phosphorus is desired, a higher degree of heat is employed, with the result that the yellow phosphorus distils over and is collected under water in a suitable receptacle—such, for instance, as in the lower part of a hydrogen-gasometer N—into which the resulting hydrogen is conducted and stored for use. The yellow phosphorus may be discharged through the valve m and collected in any suitable vessel m'. The hydrogen may be used to preliminarily heat the charge in the electric furnace; also, to decompose the phosphorus hydrids, and, further, to replace the air in the decomposing-chambers. When it is desired to produce red phosphorus only, which is a product of great commercial value, the phosphorus hydrids are conducted into any suitable receptacle and subjected to the reducing action of an electric spark, which has the effect of breaking down the phosphorus hydrids and producing red phosphorus and hydrogen.

From the foregoing it will be observed that in exposing phosphatic material to the heat of an electric furnace various calcium phosphids are produced, which may vary according to the temperature employed, and it is obvious that in the decomposition of these phosphids with water various phosphorus hydrids are evolved and that by my process this complex mixture of phorphorus hydrids is dissociated by the action of heat or other electric spark without the necessity of purification.

I do not restrict myself to the employment of the construction of apparatus herein shown and described for carrying my process into effect, as other forms and constructions of apparatus may be employed.

Having fully described my process, what I claim as new, and desire to secure by Letters Patent, is—

1. The process of producing phosphorus, which consists in subjecting phosphatic material to the decomposing action of an electric current and producing phosphids, and subjecting said phosphids to the action of water and producing phosphorus hydrids, and finally dissociating the latter by the action of heat, substantially as set forth.

2. The process of producing phosphorus, which consists in subjecting phosphatic material to the decomposing action of an electric current and producing phosphids, and subjecting said phosphids to the action of water and producing phosphorus hydrids, and finally dissociating the latter by electric sparking, substantially as set forth.

3. The process of producing phosphorus, which consists in subjecting phosphatic material to a preliminary heating of a hydrogen-burner, and finally to the decomposing action of an electric current and producing phosphids, subjecting said phosphids to the action of water and producing phosphorus hydrids, and finally dissociating the latter by the action of heat, substantially as set forth.

4. The process of producing phosphorus, which consists in subjecting phosphatic material to the decomposing action of an electric current and producing phosphids, charging the said phosphids into a decomposing-chamber, admitting hydrogen to the chamber to expel the air therefrom, subjecting the phosphids to the action of water in said chamber and producing phosphorus hydrids, and finally dissociating the latter by the action of heat, substantially as set forth.

5. The process of producing phosphorus, which consists in subjecting phosphatic material to the decomposing action of an electric current and producing phosphids, subjecting said phosphids to the action of water and producing phosphorus hydrids, drying the latter, and then dissociating the mixture by electric sparking, substantially as set forth.

6. In a process for producing phosphorus, dissociating gaseous hydrogen phosphids containing or associated with liquid and solid phosphids by the action of heat and producing phosphorus, substantially as set forth.

7. In a process for producing phosphorus, dissociating gaseous hydrogen phosphids containing or associated with liquid and solid phosphid by electric sparking and producing phosphorus, substantially as set forth.

In testimony whereof I have signed this specification in the presence of two subscribing witnesses.

ROBERT KENNEDY DUNCAN.

Witnesses:
A. W. BRIGHT,
E. N. WATERS.